United States Patent
Bejin et al.

(10) Patent No.: US 7,118,151 B2
(45) Date of Patent: Oct. 10, 2006

(54) AUTOMOTIVE WET TRUNK WITH DRAIN

(75) Inventors: Peter Bejin, Northville, MI (US); Alan Cucknell, Cambridge (GB); Iain Sabberton, Cambridge (GB); Peter Cauwood, Cambridge (GB); Julian Scarfe, Cambridge (GB); Jamie Norris, Hereford (GB); Neil Mason, Cambridge (GB)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 11/057,359

(22) Filed: Feb. 14, 2005

(65) Prior Publication Data

US 2005/0248173 A1 Nov. 10, 2005

Related U.S. Application Data

(60) Provisional application No. 60/569,107, filed on May 7, 2004.

(51) Int. Cl.
*B60R 11/06* (2006.01)

(52) U.S. Cl. .................... 296/37.1; 296/37.6

(58) Field of Classification Search ............. 296/37.1, 296/208, 38
See application file for complete search history.

(56) References Cited

U.S. PATENT DOCUMENTS

| | | | | |
|---|---|---|---|---|
| 3,287,058 A | * | 11/1966 | Wells | 296/37.14 |
| D248,845 S | * | 8/1978 | White et al. | D34/17 |
| 4,128,268 A | * | 12/1978 | Sundlof | 296/10 |
| 4,402,545 A | * | 9/1983 | Utsunomiya et al. | 296/204 |
| 5,083,632 A | * | 1/1992 | Saito et al. | 296/37.1 |
| 5,308,096 A | * | 5/1994 | Smith | 280/204 |
| 5,636,890 A | | 6/1997 | Cooper | |
| 5,947,156 A | * | 9/1999 | Tomczyk | 137/899 |
| 5,951,232 A | * | 9/1999 | Yu et al. | 414/463 |
| 5,979,962 A | * | 11/1999 | Valentin et al. | 296/37.1 |
| 6,027,155 A | * | 2/2000 | Wisniewski et al. | 296/37.1 |
| 6,145,909 A | * | 11/2000 | Staley et al. | 296/38 |
| 6,155,625 A | * | 12/2000 | Felix | 296/37.1 |
| 6,290,277 B1 | | 9/2001 | Spykerman | |
| 6,308,873 B1 | | 10/2001 | Baldas | |
| 6,361,099 B1 | * | 3/2002 | McIntosh et al. | 296/97.23 |
| 6,481,773 B1 | | 11/2002 | Salani | |
| 6,502,886 B1 | * | 1/2003 | Bleau et al. | 296/37.3 |
| 6,582,012 B1 | * | 6/2003 | Smith | 296/37.6 |
| 6,631,941 B1 | * | 10/2003 | Votruba et al. | 296/208 |
| 6,814,383 B1 | * | 11/2004 | Reed et al. | 296/37.6 |
| 6,945,594 B1 | * | 9/2005 | Bejin et al. | 296/37.1 |

* cited by examiner

*Primary Examiner*—Kiran B. Patel
(74) *Attorney, Agent, or Firm*—Gigette M. Bejin; Miller Lawgroup, PLLC

(57) ABSTRACT

A recessed storage well is formed in the rear load floor of an automotive vehicle to provide cargo transport capabilities for wet cargo. The recessed storage well is provided with a drain to permit the flow of liquids collected within the recessed storage well to be discharged externally of the vehicle. The recessed storage well is formed from impervious material to permit the storage of wet articles of cargo without dampening the carpet covering on the rear load floor. The drain is seated in an automotive frame component by a rubber grommet that prevents the transfer of vibrational noise to the recessed storage well. The drain enables the use of a water spray in clean-up operations by allowing the collected water to drain away from the recessed storage well.

5 Claims, 3 Drawing Sheets

Fig. 3
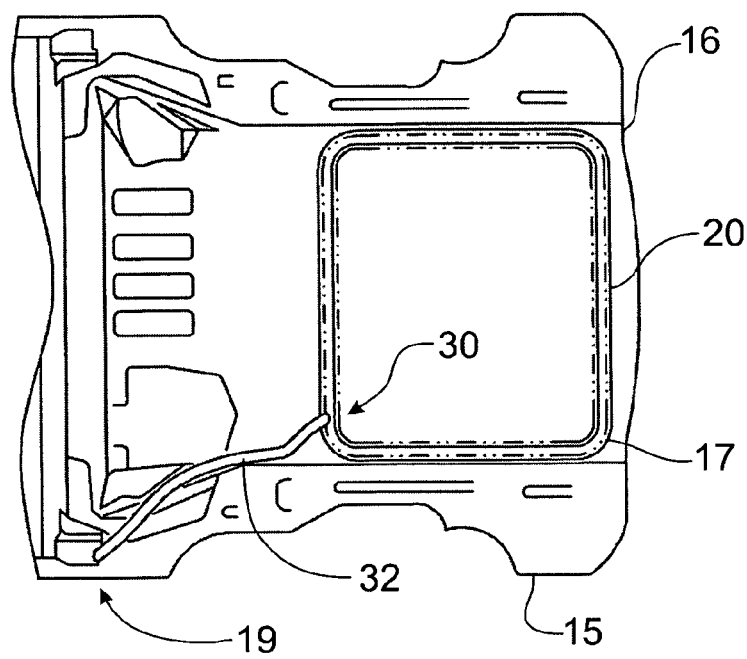
Fig. 5
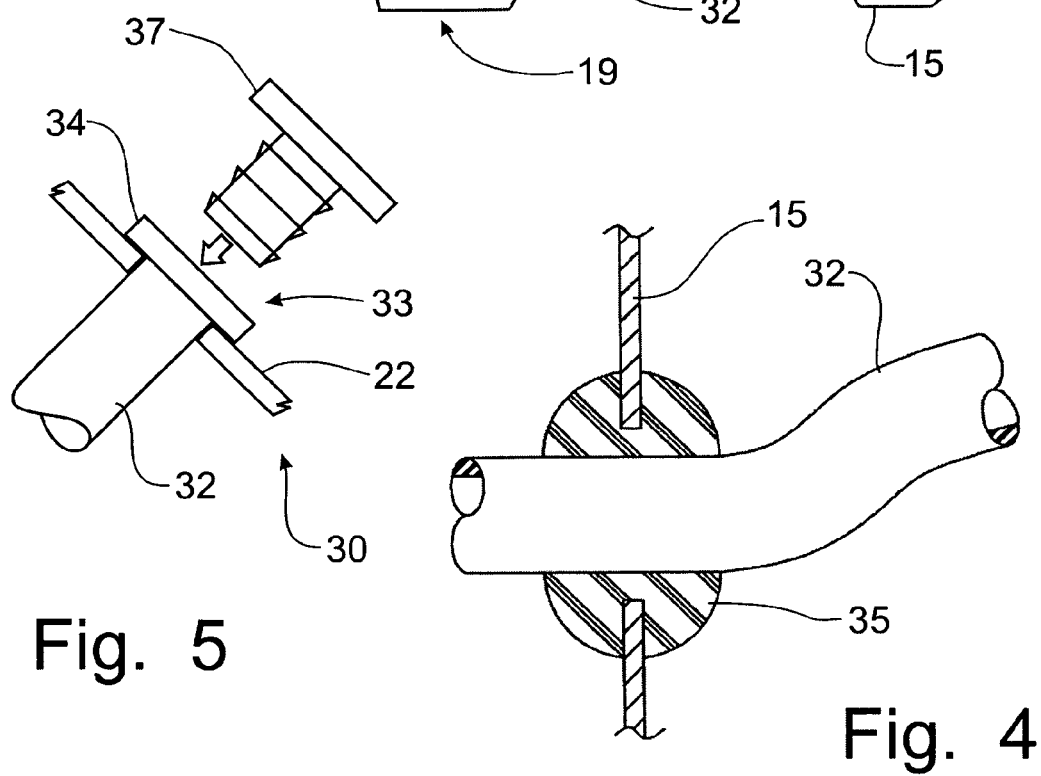
Fig. 4

AUTOMOTIVE WET TRUNK WITH DRAIN

CROSS-REFERENCE TO RELATED APPLICATIONS

This application claims domestic priority on U.S. Provisional Patent Application Ser. No. 60/569,107, filed May 7, 2004, the contents of which are incorporated herein by reference.

BACKGROUND OF THE INVENTION

Automobiles are provided with a rear load floor on which cargo can be carried. For vehicles commonly referred to as sport utility vehicles (SUV) and vehicles commonly referred to minivans, the load floor is positioned behind the seating area and is accessible through a rear door that is pivotally supported from the frame of the vehicle. In such vehicles, the spare tire is typically supported from the vehicle frame below the chassis so that the spare tire is accessible from the exterior of the vehicle beneath the cargo area.

Typically, the level of the load floor is generally coextensive with the floor of the seating area of the vehicle and is positioned substantially at the level of the rear door opening. Such an arrangement provides opportunity to create hidden cargo storage areas beneath the level of the load floor. These hidden cargo storage areas are usually provided with a covering, which can be hinged to permit the use of a latch and even a lock to provide some security for the contents of the storage area.

An example of a hidden storage area formed in the rear load floor of a vehicle having a rear access door can be found in U.S. Pat. No. 6,481,773, issued to Joseph Salani on Nov. 19, 2002, in which a pair of transversely disposed hidden storage areas is formed with hinged lids that can be latched in place. These dual hidden storage areas cover the entire load floor area and can be accessed independently through the individual hinged lids. When the lids are latched into a closed position, the recessed storage wells are hidden from sight with the closed lids forming the rear load floor.

In U.S. Pat. No. 6,308,873, issued to Jason Baldas on Oct. 30, 2001, the storage apparatus is positionable above the load floor and is formed by pivoted panels that define the storage area when oriented in an upright manner. A track supported on the load floor allows the storage apparatus to be moved longitudinally through the opening created by the opened rear door.

Recessed wells have been formed in load floors to store spare tires, as well as to provide cargo storage, as is depicted in U.S. Pat. No. 5,636,890, issued to Johnny Cooper on Jun. 10, 1997, where the retrofitted storage compartment is fitted with a removable lid to provide a wet trunk capability. Supplemental storage compartments are shown in U.S. Pat. No. 6,502,886, issued to John Bleau on Jan. 7, 2003, in which a multi-compartment supplemental storage apparatus is mounted on top of the spare tire recessed well, and in U.S. Pat. No. 6,290,277, issued to David Spykerman on Sep. 18, 2001, in which the supplemental storage compartment is associated with a folding seat apparatus.

Even pick-up trucks can be equipped with a recessed storage trunk positioned below the normal level of the load surface of the pick-up cargo bed, as is found in U.S. Pat. No. 6,471,277, issued on Oct. 29, 2002, to Brian Scensay, et al. The pivotally movable lid of the Scensay patent forms the load surface of the pick-up cargo bed when closed, and provides access to the recessed storage truck when opened. U.S. Pat. No. 4,394,100, issued to Harold K. Sperlich on Jul. 19, 1983, teaches the use of a standard sheet of plywood to form a secondary load floor above the primary load floor surface to define a covered security area between the primary and secondary load floors.

A cargo storage area formed by a recessed well below the normal load floor level can be referred to as a wet trunk as the recessed well can receive wet articles, such as bathing suits, cold drinks, ice, etc., that would otherwise dampen the carpet covering on the rear load floor. None of these cargo storage solutions provide a wet trunk in which a drain has been incorporated to enhance the clean-out capabilities of the wet trunk apparatus. It would, therefore, be desirable to provide a wet trunk structure that would facilitate clean-up of the recessed storage area.

SUMMARY OF THE INVENTION

It is an object of this invention to overcome the aforementioned disadvantages of the known prior art by providing a wet trunk storage area recessed below the level of a vehicle load floor.

It is another object of this invention to provide a wet trunk storage area for vehicles such as pick-up trucks, sport utility vehicle and mini-vans, where the lid of the wet trunk apparatus forms a portion of the load floor of the vehicle.

It is a feature of this invention that the wet trunk can be implemented into the load floor of the cargo area of a vehicle such as sport utility vehicles, pick-up trucks and mini-vans.

It is still another object of this invention to provide a wet trunk storage area that can be cleaned easily and conveniently.

It is another feature of this invention that the wet trunk recessed storage area is provided with a drain to permit liquid and associated soil, dirt and particulates collected within the recessed storage area.

It is an advantage of this invention that the liquid material collected in the recessed storage well can be removed through the drain to the environment externally of the vehicle.

It is another advantage of this invention that the wet trunk recessed storage area can be cleaned with a water spray to facilitate cleaning operations.

It is still another feature of this invention that the drain is supported in a rubber grommet to prevent the transmission of vibrational noises into the recessed storage area.

It is still another advantage of this invention that the cleaning of a storage well beneath the level of a rear load floor is facilitated by the inclusion of a drain in flow communication with the storage well.

It is yet another advantage of this invention that the wet trunk provides a compartment that in which soiled items can be segregated from the rest of the vehicle interior.

It is yet another feature of this invention that the recessed storage well defining a wet trunk storage area below the level of a rear load floor in an automobile is provided with a hinged lid to cover the storage well to permit use thereof as a conventional load floor cargo area in the vehicle.

It is a further feature of this invention that the compartment with the lid thereof opened or removed can provide a good accommodation area for pets.

It is a further object of this invention to provide a recessed storage area for an automotive load floor that is durable in construction, inexpensive of manufacture, carefree of maintenance, facile in assemblage, and simple and effective in use.

These and other objects, features and advantages are accomplished according to the instant invention by providing a recessed storage well formed in the rear load floor of an automotive vehicle to provide cargo transport capabilities for wet cargo. The recessed storage well is provided with a drain to permit the flow of liquids collected within the recessed storage well to be discharged externally of the vehicle. The recessed storage well is formed from impervious material to permit the storage of wet articles of cargo without dampening the carpet covering on the rear load floor. The drain is seated in an automotive frame component by a rubber grommet that prevents the transfer of vibrational noise to the recessed storage well. The drain enables the use of a water spray in clean-up operations by allowing the collected water to drain away from the recessed storage well.

BRIEF DESCRIPTION OF THE DRAWINGS

The advantages of this invention will become apparent upon consideration of the following detailed disclosure of the invention, especially when taken in conjunction with the accompanying drawings wherein:

FIG. 3 is a bottom plan view of the recessed storage well component shown in FIG. 2;

FIG. 4 is an enlarged cross-sectional detain view of the mounting of the drain through a frame component of the vehicle;

FIG. 5 is an enlarged detail view of the interior end of the drain tube and removable plug therefor.

DETAILED DESCRIPTION OF THE PREFERRED EMBODIMENT

Figure 1:
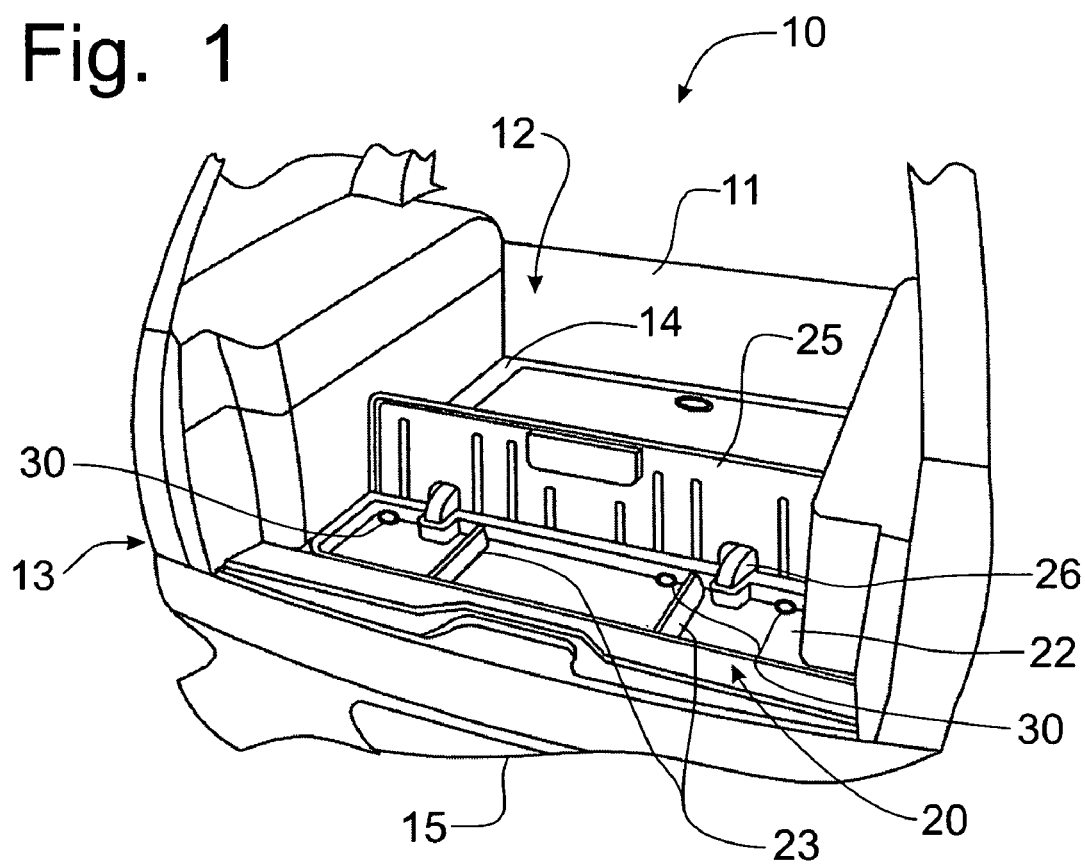
FIG. 1 is a rear perspective view of an automotive vehicle in which a recessed storage well incorporating the principles of the instant invention has been formed into the rear load floor of the vehicle, a hinged lid covering the recessed storage well is shown in the raised position.

Referring to the drawings, a rear cargo area 12 of an automobile 10 incorporating the principles of the instant invention can best be seen. The rear load floor 14 forms the floor portion of the cargo area 12, which typically is found at the rear of the vehicle, such as a sport utility vehicle, a minivan or a pick-up truck, behind the rear seat 11 adjacent the rear access opening 13 which is closed by a rear door (not shown). In the case of a pick-up truck, such as the pick-up truck 10a representatively depicted in FIG. 6, the cargo area 12 is supported by the chassis 15 rearwardly of the passenger compartment 18 in a typically open configuration.

The chassis 15 at the rearward portions of the automobile 10 is formed with a floor pan 16 that is typically formed as a stamping from sheet metal. According to the principles of the instant invention the floor pan 16 will be formed with a recessed well 17 to support a storage compartment liner 22, as will be described in greater detail below. The wet trunk 20 preferably includes the plastic liner 22 which can be in any one of a number of specific configurations, including the multi-compartment, vehicle wide configuration, incorporating multiple dividers 23 as depicted in FIG. 1, or a single compartment without dividers 23 as is depicted in the pick-up truck embodiment of the invention shown in FIG. 6. Preferably, the plastic liner 22 will be formed from a water-impermeable tough polymer which may be coated, e.g. with PTFE, to provide an ease in cleaning.

Referring to the configuration depicted in FIG. 1, the wet trunk structure 20 can be formed as a three compartment liner 22 defined by two dividers 23, which can be removable from the liner 22 or movably positionable within the liner 22. Furthermore, substantially the entire rear load floor 14 can be equipped with wet trunks 22. As depicted in FIG. 1, a forward wet trunk structure 20a can define a separate and distinct hidden storage compartment from the rearward wet trunk structure 20. A movable lid 25, which is preferably hinged to the plastic liner 22 by hinges 26 to facilitate the utilization of the lid 25 from a raised, opened position as depicted with the rearward wet trunk 20 and a lowered, closed position as depicted with respect to the forward wet trunk structure 20a. When closed, the lid 25 is preferably contiguous with the remainder of the rear load floor 14 to provide a planar structure for the positioning of cargo thereon.

Figure 2:
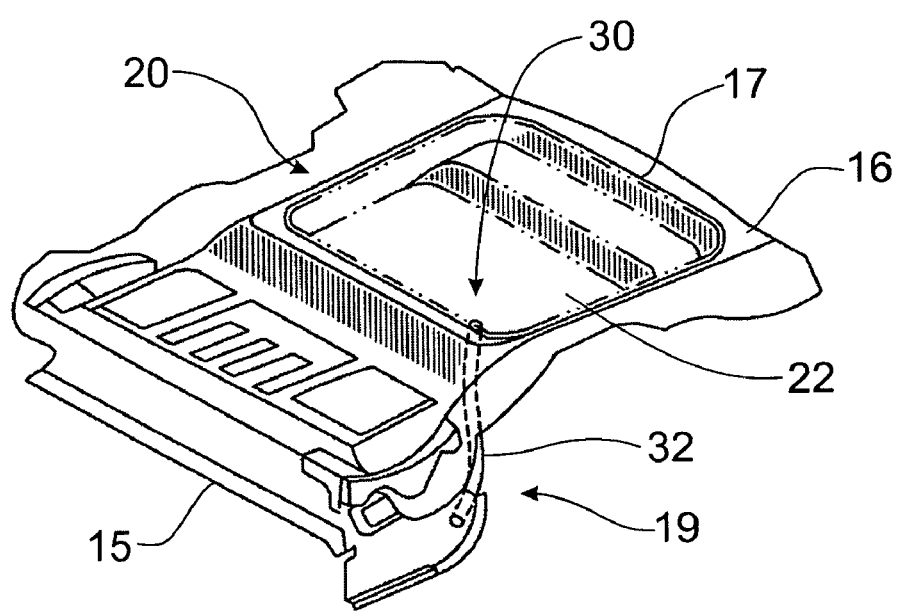
FIG. 2 is an enlarged partial perspective detail view of a component of the recessed storage well incorporating a drain in flow communication with the recessed storage well.
Figure 6:
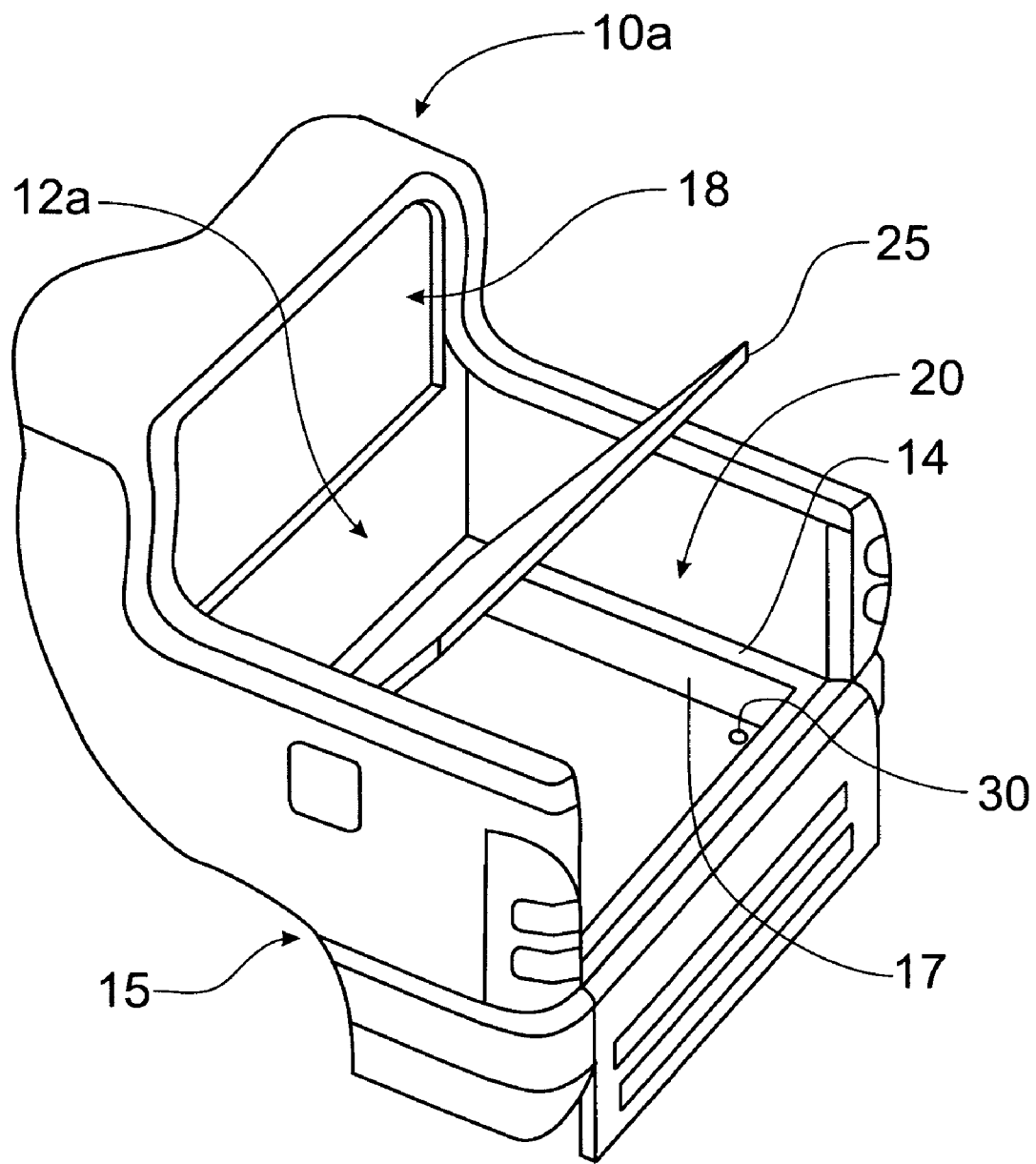
FIG. 6 is a partial left, rear perspective view of a pick-up truck having formed into the cargo bed a wet trunk incorporating the principles of the instant invention.

Referring now to FIGS. 2, 3 and 6, a representative wet trunk compartment is depicted according to the principles of the instant invention. The multi-compartment wet trunk structure 20, as depicted in FIG. 1, can be converted into a single compartment structure, corresponding to the depiction in FIGS. 2 and 3, by the removal of the dividers 23. For wet trunk structures 20 that would be formed with non-removable dividers 23, each individual compartment would preferably be formed as described below with respect to the representative wet trunk compartment 20 in FIGS. 2 and 3.

As is best seen in FIG. 6, another embodiment of the wet trunk 20 is an incorporation thereof into the cargo bed 12a of a pick-up truck 10a which is positioned on the chassis 15 rearwardly of the passenger compartment 18 of the vehicle 10a. As represented in the embodiment of FIG. 6, the wet trunk 20 can be formed without dividers (not shown) and can encompass substantially the entire load floor surface 14. The pivotally movable lid 25 forms a corresponding portion of the load floor 14 when closed and opens to provide access to the interior of the wet trunk 20 when opened, as shown in FIG. 6. The drain 30 is located in the floor of the wet trunk 20 to effectively drain the entire wet trunk 20 structure.

To facilitate clean-out and removal of liquids accumulated within the wet trunk compartment 20, a drain 30 is provided at the lowest position of the wet trunk compartment 20 in flow communication with the liner 22 through the recessed well 17 in the floor pan. The drain 30 includes a drain tube 32, which can be formed of a length of flexible hose that extends from the liner 22 to an existing wet area of the vehicle, such as the rocker 19. To prevent the transfer of vibrational noises and to also prevent the leakage of exhaust fumes, the drain tube 32 is mounted in rubber grommets or seals 35 at both the floor pan 17 and at the rocker 19, thus positively locating the drain tube 32 with respect to the chassis 15 of the vehicle 10. Preferably, the drain 30 will be formed as short as possible and as vertical as possible within the structural limitations of the vehicle chassis 15.

As best seen in FIG. 4, the rubber grommets 35 are mounted in holes formed in the sheet metal 36 forming the recessed well 17 and the rocker 19. The central opening through the grommet 35 tightly seals against the drain tube 32 to prevent the leakage of exhaust fumes and other gases from the exterior environment through the hole in the sheet metal 36. The resilient nature of the rubber grommet 35 also prevents the transmission of vibrations to the drain tube 32 that could reverberate into the wet trunk 20.

As is best seen in FIG. 5, the interior end 33 of the drain tube 32 can be formed with a flare 34 that will seal against the plastic liner 22, while a plug 37 can be received at the interior end 33 of the drain tube 32 to seal off the drain tube 32 from the exterior atmosphere. To open the drain tube 32 for the removal of accumulated liquids in the wet trunk 20, the plug 37 would simply be removed and then reinserted into the interior end 33 of the drain tube 32 when finished with the clean-out process. Preferably, the wet trunk 20 should be formed without any acute angles in which soil could accumulate and, thereby facilitate clean-out. As an alternative, the drain tube 32 could be formed with a U-bend trap to prevent the transmission of gases into the interior of the vehicle 10.

In operation, the wet trunk 20 can be accessed by lifting the lid 25. Wet articles, such as bathing suits, boots, and drink bottles, can be placed into the opened storage compartment 20. As an example, the wet trunk 20 could house ice cubes into which drink bottles could be placed to keep the drinks cold during transport. When utilization of the wet trunk storage compartment 20 is finished and clean-out, or emptying of accumulated liquid, is desired, the plug 37 is removed from the drain tube 32 and the accumulated liquid is drained to the exterior of the vehicle 10.

Clean-out of the wet trunk storage compartment 20 is also enhanced as a water spray can be directed into the liner 22 to urge any small accumulated debris particles, such as sand, out of the compartment 20 through the drain tube 32. When cleaning is completed, the plug 37 is reinserted into the interior end 33 of the tube 32, the lid 25 is closed, and the rear load floor 14 is returned to a planar condition.

Alternatively, the floor of the wet trunk 20 could be formed with grooves between raised lands to facilitate the drainage of liquids from articles placed thereon into the drain 30. Furthermore, the floor could be formed with an elevated section that would form a segregated dry compartment within the wet trunk 20. One skilled in the art will recognize that the wet trunk 20 could form substantially the entire cargo area 12 of a vehicle 10 or, if smaller than the entire cargo area 12, the wet trunk 20 could be oriented longitudinally, rather than laterally as depicted in the drawings. One skilled in the art will also recognize that the location for the wet trunk 20 does not need to be limited to the rear cargo area 12 of the vehicle 10, but could be located beneath any floor surface of the vehicle 10 in which sufficient room exists structurally to accommodate the wet trunk 20.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

In the way of examples, the lid 25 of the wet trunk 20 could be hinged for movement through approximately 180 degrees to cover the dry area of the rear cargo area when opened. Furthermore, the lid 25 could provide an air-tight seal against the plastic liner 22 to prevent the escape of odors from the compartment 20. The plastic liner 22 could be formed from a flexible material that would permit removal of the plastic liner 22 from the wet trunk 20 and inverted to facilitate cleaning thereof.

In the way of additional examples, hangers or hooks could be formed in the interior of the vehicle in vertical alignment with the wet trunk 20 to permit wet items to be suspended over the compartment 20 for drainage into the plastic liner 22 and, thereby, facilitate the drying of the items. The compartment 20 could also incorporate a heating or air conditioning vent or outlet to expedite the drying of wet items stored therein.

In the way of further examples, the drain 30 could be formed without a drain tube 32 reducing the possibility of the drain 30 becoming clogged or damaged. Furthermore, the drain 30 could incorporate a pump to expedite the removal of liquids from the compartment 20 and could incorporate a filter to avoid blockage of the drain tube 32.

Having thus described the invention, what is claimed is:

1. In a vehicle having a chassis supporting a rear cargo load floor defining a generally planar surface, an improved storage compartment comprising:
    a recessed well formed into said rear cargo load floor to define a recessed storage compartment below the generally planar surface of the rear cargo load floor;
    a drain in flow communication with the recessed storage compartment to direct fluids accumulated in said recessed storage compartment externally of said recessed storage compartment;
    wherein said recessed storage compartment is provided with a plastic liner seated in said recessed well, said drain being in flow communication with said plastic liner; and
    wherein said recessed well is formed of sheet metal having a hole formed therein for the passage of said drain, said drain including a drain tube supported in a rubber grommet mounted in said hole.

2. The vehicle of claim 1 wherein said drain is provided with a removable plug selectively closing an internal end of said drain tube in flow communication with said liner.

3. The vehicle of claim 1 wherein said drain tube is also supported in a rubber grommet mounted in said chassis at a location remote from said recessed well.

4. The vehicle of claim 1 wherein said recessed storage compartment is provided with a lid movable between an opened position in which access into said recessed storage compartment is enabled and a closed position in which said lid is oriented in said planar surface of said rear cargo load floor.

5. The vehicle of claim 4 wherein said recessed storage compartment is provided with removable dividers selectively creating multiple storage compartments from said recessed storage compartment.

* * * * *